April 1, 1924.
W. V. TURNER
ELECTRIC COUPLING FOR CARS
Filed May 22, 1919
1,488,570
2 Sheets-Sheet 2
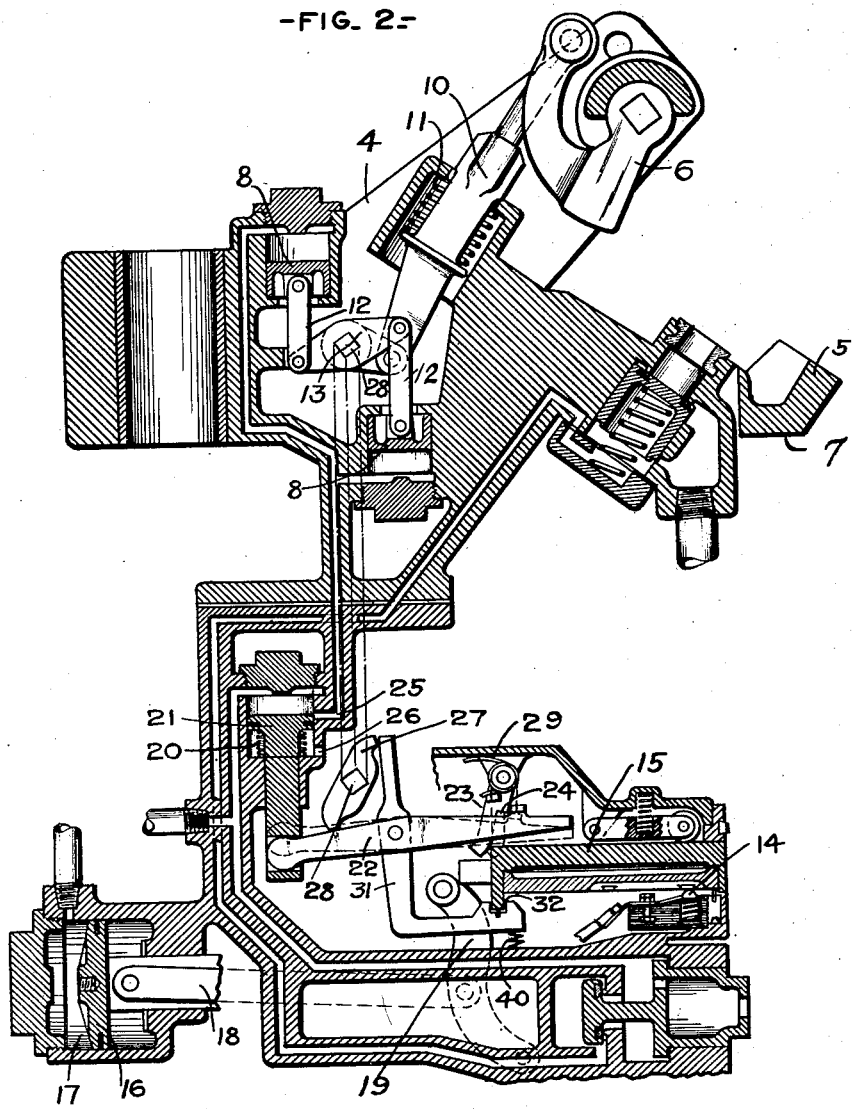
-FIG. 2.-
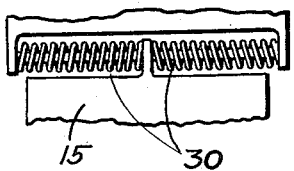
-FIG. 3.-
INVENTOR
Walter V. Turner (dec'd)
S.C. McConahey, Adm'r.
Edward H. Wright
Atty.

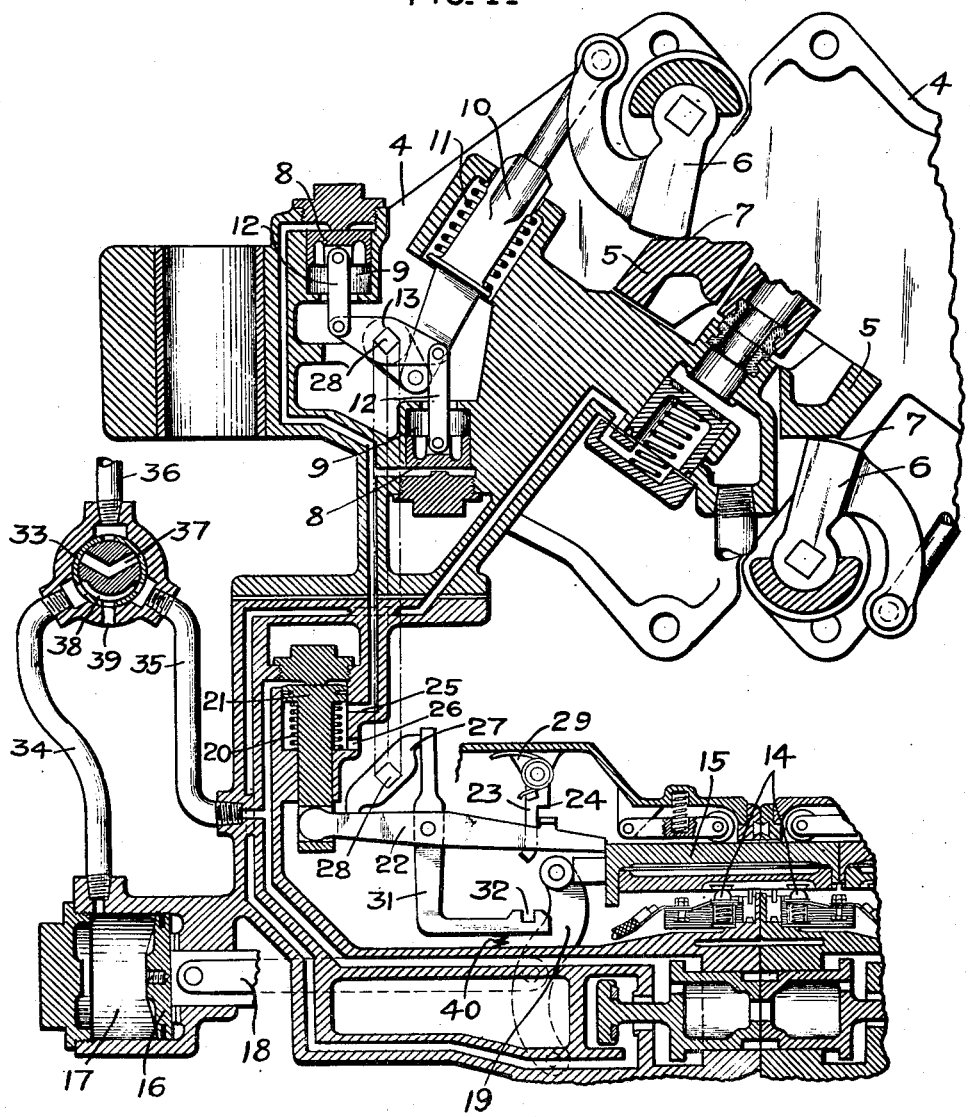

Patented Apr. 1, 1924.

1,488,570

UNITED STATES PATENT OFFICE.

WALTER V. TURNER, DECEASED, LATE OF WILKINSBURG, PENNSYLVANIA; BY SAMUEL C. McCONAHEY, ADMINISTRATOR, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTRIC COUPLING FOR CARS.

Application filed May 22, 1919. Serial No. 299,018.

*To all whom it may concern:*

Be it known that WALTER V. TURNER, deceased, late a citizen of the United States, and resident of Wilkinsburg, in the county of Allegheny and State of Pennsylvania, has invented a certain new and useful Improvement in Electric Couplings for Cars, of which improvement the following is a specification.

This invention relates to car and electric couplings, and particularly to that type of coupling in which the counterpart coupler heads are adapted to be rigidly locked together, and are also provided with movable electric portions adapted to be projected for establishing electrical connection between the cars.

Automatic couplings of this type have heretofore been employed, having pivoted latch levers for locking the coupler heads together, pistons actuated by fluid pressure for releasing the locks, and a movable slide or carrier having electric contacts and adapted to be projected by fluid pressure, to establish electrical connection between the corresponding train line circuits on adjoining cars.

It is important with this type of coupling, that the electric contact slide should not be projected until the two couplers have been securely locked together in the coupling operation, and also that the contact slide should be withdrawn before the coupler locks are unlatched for uncoupling, in order to prevent damage or injury to the slide, and the object of this invention is to provide interlocking means between the coupler locks and the electric contact slide, and controlled by the movement of the coupler locks in the coupling operation, for locking the slide against outward movement until the couplers are completely coupled and locked together.

In the accompanying drawings: Figure 1 is a diagrammatic sectional view, showing one form of combined car and electric coupling embodying this improvement, the parts being shown in coupled position; Fig. 2, a similar sectional view, showing the parts in position for coupling; and Fig. 3, a detail view, illustrating the return springs for the electric contact slide.

According to this construction, the coupler head is of the usual rigid lock type, having a casting, 4, provided with a hook-shaped projection, 5, adapted to interlock by a forward and lateral movement with the corresponding projection of the counterpart coupler, a pivoted latch or locking lever, 6, adapted to engage a clamping surface, 7, on the counterpart coupler, pistons, 8, mounted in cylinders, 9, and connected by means of links, 12, lever, 13, and rod, 10, with the latch lever, 6, and a spring, 11, for normally moving said latch to its locked position.

The electric portion which is usually attached beneath the coupler head, comprises the contact carrier or slide, 15, having suitable contacts for co-operating with the respective contacts, 14, of the car line circuits, piston, 16, mounted in cylinder, 17, and connected by rod, 18, and lever, 19, with the slide, 15. When the slide is extended as shown in Fig. 1, the trigger lever, 22, locks the same in position, the trigger being actuated by the piston, 21, and the spring, 20. A detent lever, 23, having a shoulder, 24, and spring, 29, is employed for limiting the preliminary releasing movement of the trigger lever, 22, and piston, 21, so as to permit the return movement of the slide, 15, before the port, 25, is opened to admit fluid to the unlatching pistons, 8, of the coupler. The detent lever is adapted to be engaged by the slide, 15, and pushed out of the way so that the trigger lever, 22, is released from the stop shoulder, 24, when the slide, 15, has returned to its neutral position by means of the usual centering springs, 30.

In order to prevent a premature outward movement of the slide, 15, at the time that the couplers are coming together in the act of coupling, an interlocking lever, 27, is mounted on shaft, 28, of lever, 13, and engages a locking lever, 31, having a notch, 32, for holding the slide, 15, in its neutral position when the coupler latch, 6, is depressed by the other coupler, and before the latch has moved to its locked position.

The coupler may be controlled by a hand operated valve, 33, which may be located in the cab at the end of the car, and having connections, 34, and 35, with the coupler and a supply pipe, 36, the valve also being provided with suitable ports, 37 and 38, and exhaust port, 39.

The operation of the device is as follows: When the parts of the coupler are in their normal uncoupled and neutral position, and two counterpart couplers are then brought together in the act of coupling, the first operation is for the projection, 5, of the one coupler to engage and depress the latch, 6, of the other coupler, thereby moving the unlocking pistons, 8, lever, 13, shaft, 28, and interlocking lever, 27, to permit the spring, 40, to actuate the locking lever, 31, so that the notch, 32, engages the slide, 15, as indicated in Fig. 2, and positively prevent a premature outward movement thereof. When the coupler heads have reached the fully coupled position, and the latch levers, 6, have moved out to engage the clamping surfaces, 7, the spring, 11, actuates the levers, 13 and 27, to release the locking lever, 31, and permit the free outward movement of the slide, 15. The valve, 33, on one of the cars is then turned to the position in which the port, 37, connects the supply pipe, 36, with pipe, 34, thereby admitting fluid to act on piston, 16, and project the slide, 15, to its coupled position, in which it is held by the trigger lever, 22, as shown in Fig. 1. The hand operated valve is then returned to neutral position, and the coupling operation is complete.

When it is desired to uncouple and separate the cars, the valve, 33, is turned to uncoupling position, in which the fluid under pressure is supplied to pipe, 35, and to piston, 21, thereby moving the same down part way and actuating the trigger lever, 22, against the stop, 24. This movement is sufficient to release the slide, 15, but is not enough to open the port, 25, leading to the unlatching pistons, 8, therefore the couplers remain locked together and the slide, 15, is returned to neutral position by the centering springs, 30. As the slide reaches its neutral position, however, it engages the detent lever, 23, and releases the shoulder, 24, from the trigger, 22, whereupon the fluid acting on piston, 21, moves the same downward its full stroke, opening the passage, 25, and admitting fluid to the unlatching pistons, 8, thus withdrawing the coupler latch, 6, and permitting the separation of the couplers. The usual air connections are made between the movable parts of the counterpart couplers when the same are coupled together, so that both are actuated at the same time by the manipulation of the hand valve upon either car.

After the couplers are separated, the hand valve is returned to normal position, in which air is exhausted from piston, 21, and from the unlatching pistons, through ports, 38 and 39. Also, after the piston, 21, is returned by its spring, 20, further escape of air from the cylinders of the unlatching pistons will occur through ports, 25 and 26, to the atmosphere.

It will thus be seen that by means of this improved construction, the interlocking levers are operated automatically by the preliminary meeting movement of the coupler in the act of coupling, to positively lock the slide in its neutral position and prevent the same from being prematurely projected before the couplers are fully locked together. Also, in the uncoupling operation, the detent lever prevents the admission of fluid to the unlatching pistons until the slide has been withdrawn, thereby ensuring safety and protection to the electrical connections.

It will also be noticed that the interlocking arm or lever, 27, bears upon the trigger lever, 22, and this is for the purpose of tripping the trigger, 22, whenever, for any reason, the latch lever, 6, should accidentally be so shifted as to allow a pulling apart of the coupler heads. Under such conditions, it is important to promptly withdraw the electric contact slide in order to prevent damage to the same by the accidental pulling apart of the coupler heads, and as the interlocking lever releases the trigger, the slide is promptly returned and thus protected from injury.

Having now described my invention, what I claim as new and desire to secure by Letters Patent is:

1. In a car and electric coupling, the combination of a coupler head having a movable lock, a movable contact carrier, means for projecting said contact carrier, a locking lever having a fixed pivot on the coupler head for holding said carrier in its neutral position, a shaft having a lever arm, a connection between said arm and the movable lock, and an interlocking lever also mounted on said shaft for releasing said locking lever.

2. In a car and electric coupling, the combination of a coupler head having a movable lock, a movable contact carrier, fluid pressure means for projecting said contact carrier, a trigger lever pivoted on the coupler head for holding said carrier in its projected position, a locking lever also pivoted on the coupler head for holding said carrier in its neutral position, and an interlocking lever operated by the movement of the coupler lock for engaging both the locking lever and the trigger.

In testimony whereof I have hereunto set my hand.

SAMUEL C. McCONAHEY,
*Administrator of the Estate of Walter V. Turner, deceased.*